US012769631B2

(12) United States Patent
George et al.

(10) Patent No.: US 12,769,631 B2
(45) Date of Patent: Oct. 20, 2026

(54) EXECUTING PROCESSOR CORE USAGE MONITOR TOOL DURING SOFTWARE INSTALLATION

(71) Applicant: INTERNATIONAL BUSINESS MACHINES CORPORATION, Armonk, NY (US)

(72) Inventors: Richard George, Krzywaczka (PL); Grzegorz Piotr Szczepanik, Cracow (PL); Piotr Kalandyk, Zielonki (PL); Łukasz Tomasz Jęda, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 18/617,766

(22) Filed: Mar. 27, 2024

(65) Prior Publication Data

US 2025/0307100 A1 Oct. 2, 2025

(51) Int. Cl.

| | |
|---|---|
| ***G06F 11/30*** | (2006.01) |
| ***G06F 8/61*** | (2018.01) |
| ***G06F 11/34*** | (2006.01) |

(52) U.S. Cl.
CPC ............ *G06F 11/3024* (2013.01); *G06F 8/61* (2013.01); *G06F 11/3409* (2013.01)

(58) Field of Classification Search
CPC ..... G06F 11/3024; G06F 11/3409; G06F 8/61
USPC .................................................. 717/164–178
See application file for complete search history.

(56) References Cited

U.S. PATENT DOCUMENTS

| | | | | |
|---|---|---|---|---|
| 7,707,573 | B1 * | 4/2010 | Marmaros | G06F 8/61 717/121 |
| 8,374,823 | B1 * | 2/2013 | Williams | G06F 11/3058 714/728 |
| 9,354,886 | B2 * | 5/2016 | Gunna | G06F 9/3861 |
| 9,436,531 | B1 * | 9/2016 | Chen | G06F 11/3003 |
| 9,459,983 | B2 * | 10/2016 | Lingen | G06F 11/3041 |
| 9,519,513 | B2 * | 12/2016 | Zada | G06F 11/30 |
| 10,554,516 | B1 * | 2/2020 | Moore | H04L 67/12 |

(Continued)

OTHER PUBLICATIONS

Magherusan-Stanciu et al, "Grid Site Installation, Management and Monitoring Application", IEEE, pp. 1-8 (Year: 2011).*

(Continued)

*Primary Examiner* — Anil Khatri
(74) *Attorney, Agent, or Firm* — Rakesh Roy, Esq.; Kevin P. Radigan, Esq.; Heslin Rothenberg Farley & Mesiti P.C.

(57) ABSTRACT

A computing usage monitor process is provided which includes executing, at least in part, a software installation on a processor, where the processor has multiple cores of different performance type, and during the executing of the software installation on the processor, executing a usage monitor tool. Executing the usage monitor tool includes monitoring, during the executing of the software installation, one or more processes of the software installation executing on the processor, and scanning, via a processor query, the processor at a defined frequency for core-related data of one or more particular cores executing the one or more processes of the software installation. Further, executing the usage monitor tool includes storing, based on the scanning, the core-related data of the one or more particular cores executing the one or more processes of the software installation.

18 Claims, 5 Drawing Sheets

(56) References Cited

U.S. PATENT DOCUMENTS

| | | | | |
|---|---|---|---|---|
| 11,029,972 | B2 * | 6/2021 | Vichare | G06F 11/3466 |
| 11,275,623 | B1 * | 3/2022 | Cieslak | G06F 9/505 |
| 11,645,071 | B1 * | 5/2023 | Liu | G06F 11/1433<br>717/178 |
| 11,816,506 | B2 * | 11/2023 | Cieslak | G06F 11/3024 |
| 12,333,290 | B2 * | 6/2025 | Fortin | G06F 8/61 |
| 12,386,720 | B1 * | 8/2025 | Russell | G06F 11/3034 |
| 2007/0043672 | A1 | 2/2007 | Martin et al. | |
| 2014/0122159 | A1 | 5/2014 | Lei et al. | |
| 2019/0324878 | A1 | 10/2019 | Tkaczyk-Walczak et al. | |
| 2021/0158373 | A1 | 5/2021 | Srivastava et al. | |

OTHER PUBLICATIONS

Lientz et al, "Characteristics of Application Software Maintenance", ACM, pp. 1-6 (Year: 1978).*

Heiner, "Secure Software Installation in a Mobile Environment", ACM, pp. 1-2 (Year: 2007).*

Falaki et al, "SystemSens: A Tool for Monitoring Usage in Smartphone Research Deployments", ACM, pp. 1-6 (Year: 2011).*

Canizo et al, "Implementation of a Large-Scale Platform for Cyber-Physical System Real-Time Monitoring", IEEE, pp. 1-12 (Year: 2019).*

Fenton et al, "Software Metrics: Roadmap", ACM, pp. 1-14 (Year: 2000).*

Wright, Arol, "Intel CPUs Explained: What Are E-Cores and P-Cores?," https://www.makeuseofcom/intel-cpus-explained-what-are-e-cores-and . . . , May 2, 2023, pp. 1-9.

Dynamic, "Introduction to Per Core Licensing and Basic Definitions," Apr. 2017, pp. 1-9.

E-Capital, "Understanding IBM's PVU License," https://ecapitaladvisors.com/blog/ibm-pvu-license/, Aug. 1, 2023, pp. 1-3.

Helali, Leila et al., "Intelligent and Compliant Dynamic Software License Consolidation in Cloud Environment," Jul. 25, 2022, pp. 1-35.

* cited by examiner

EXECUTING PROCESSOR CORE USAGE MONITOR TOOL DURING SOFTWARE INSTALLATION

BACKGROUND

One or more aspects relate, in general, to facilitating processing within a computing environment, and more particularly, to generating one or more processor core-based, computing usage metrics during operation of a computing machine.

A variety of computing usage metrics can be used to evaluate a computing environment, including to evaluate performance. Examples include central processing unit (CPU) processing time, CPU usage percentage, memory usage, processor response time, unused available physical memory, unused virtual memory, etc. Based on the results of the computing usage monitoring, performance tuning can be facilitated, for instance, to improve system performance, including software execution.

SUMMARY

Certain shortcomings of the prior art are overcome, and additional advantages are provided herein through the provision of a computer-implemented method of facilitating processing within a computing environment. The computer-implemented method includes executing, in part, a software installation on a processor. The processor has multiple cores with different types of performance. In addition, the computer-implemented method includes, during the executing of the software installation on the processor, executing a usage monitor tool. Executing the usage monitor tool includes monitoring, during the executing of the software installation, one or more processes of the software installation executing on the processor, and scanning, via a processor query, the processor at a defined frequency for core-related data for one or more particular cores of the multiple cores. The one or more particular cores are executing the one or more processes of the software installation. In addition, executing the usage monitor tool includes storing, based on the scanning, the core-related data of the one or more particular cores executing the one or more processes of the software installation.

Computer program products and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Aspects of the present disclosure and certain features, advantages, and details thereof, are explained more fully below with reference to the non-limiting example(s) illustrated in the accompanying drawings. Descriptions of well-known systems, devices, processing techniques, tools, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in software, hardware, or a combination thereof.

Figure 1:
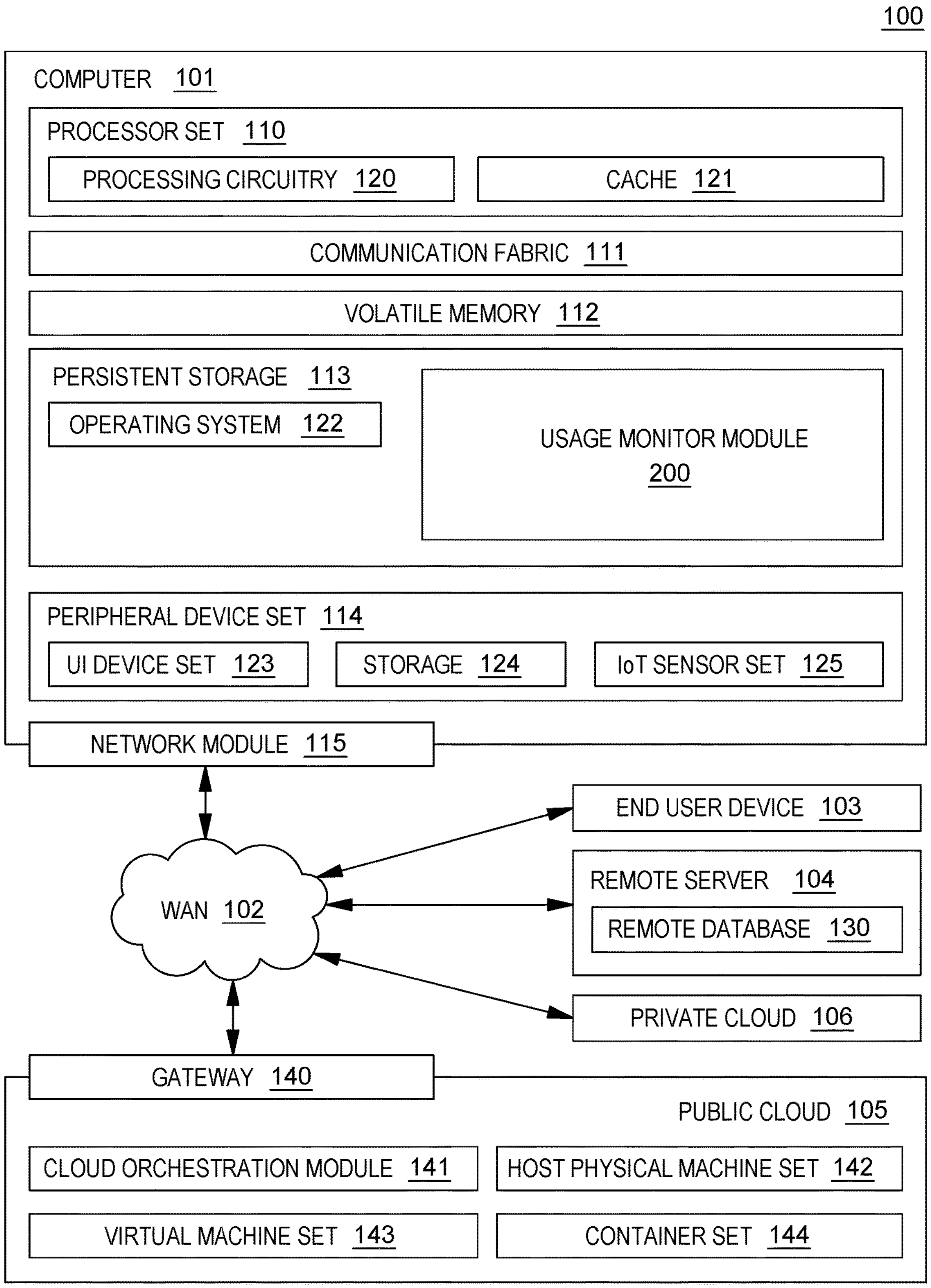
FIG. 1 depicts one example of a computing environment to include and/or use one or more aspects of the present disclosure.

As understood by one skilled in the art, program code or instructions, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and usage monitor module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one or more processor sets, each with one processor or multiple processors, and/or any other type of environment and/or configuration, etc., that is capable of executing a process (or multiple processes) that, e.g., perform usage monitor processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as usage monitor module 200. In addition to usage monitor module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and usage monitor module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in module 200 in persistent storage 113.

Communication fabric 111 is the signal conduction path that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2:
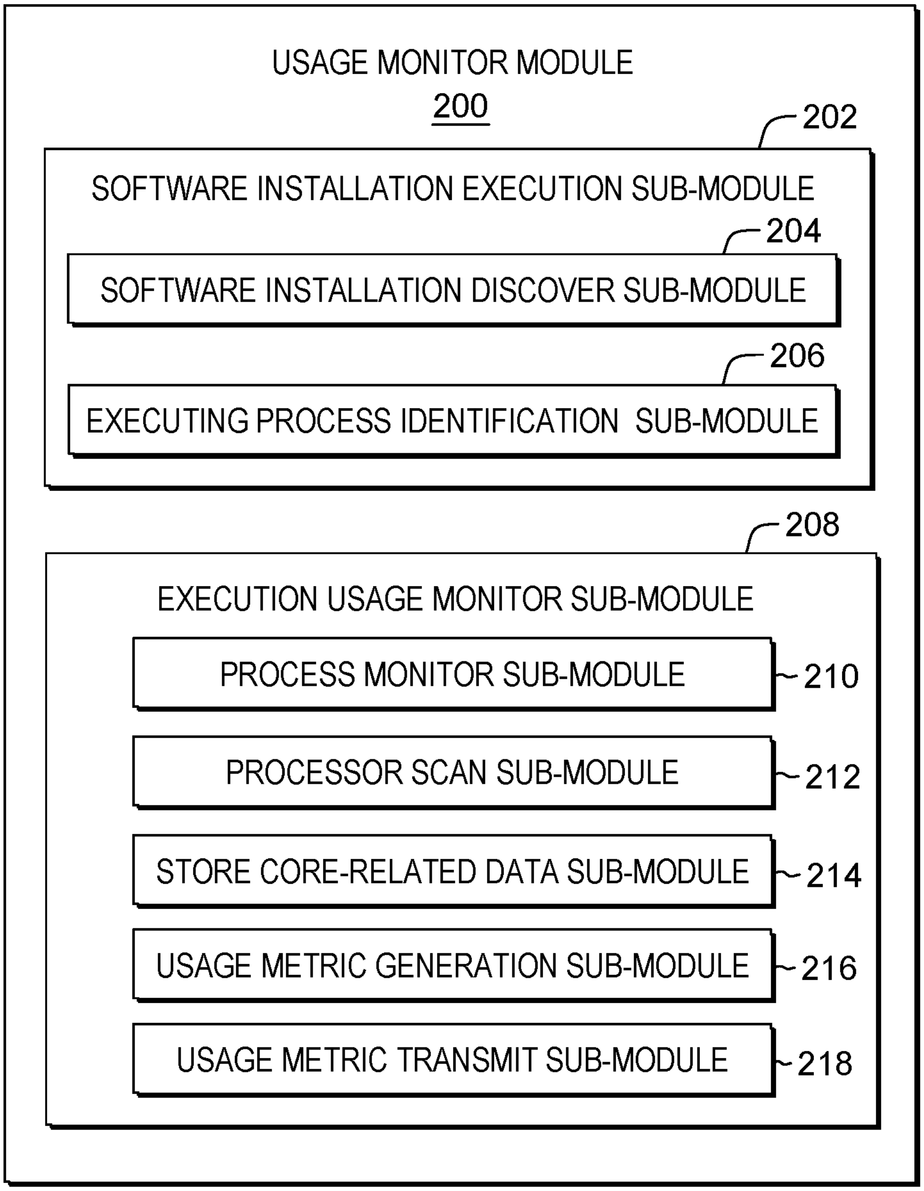
FIG. 2 depicts one embodiment of a computer program product with a usage monitor module, in accordance with one or more aspects of the present disclosure.
Figure 3:
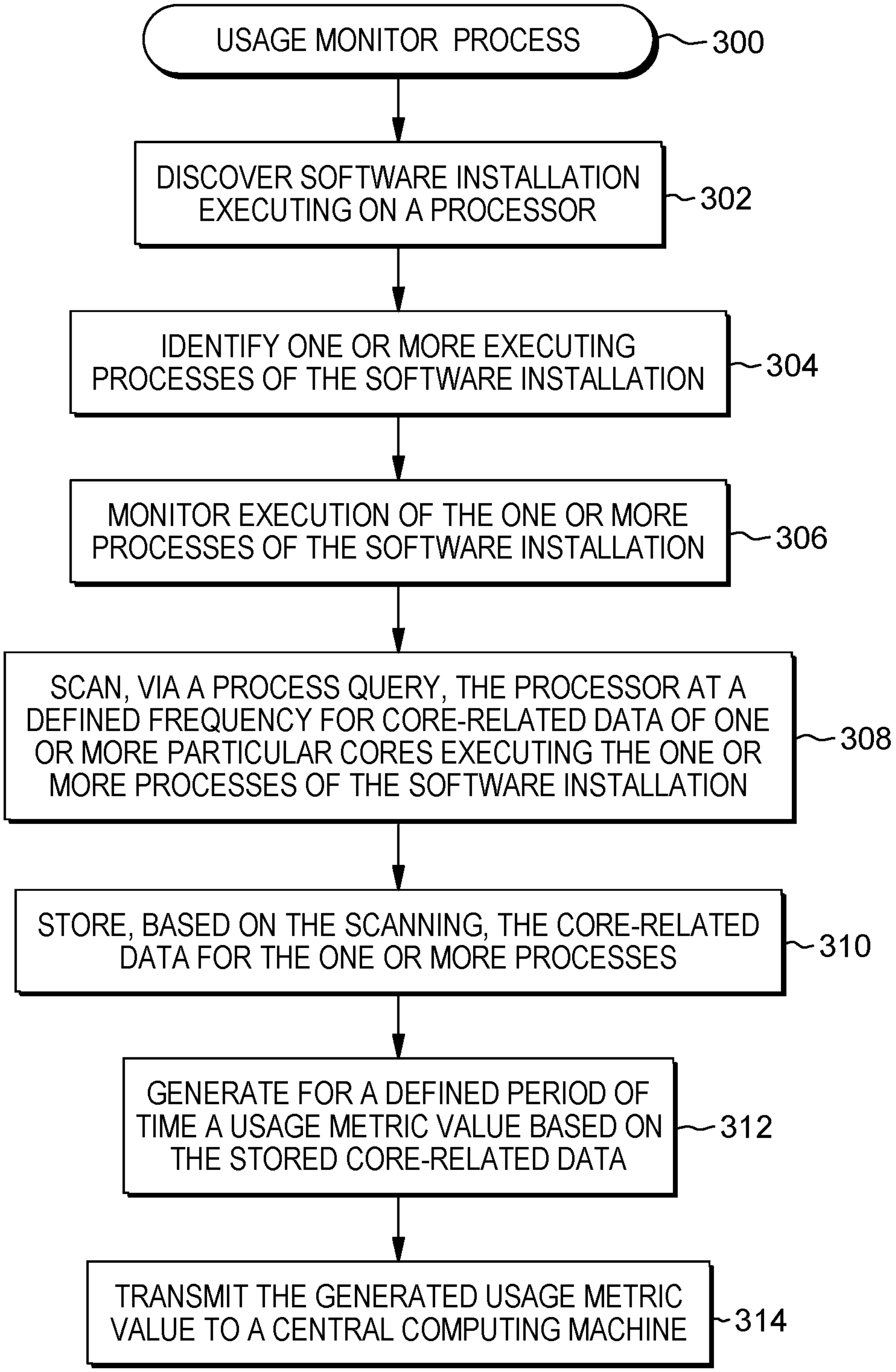
FIG. 3 depicts one embodiment of a usage monitor process, in accordance with one or more aspects of the present disclosure.

By way of example, one or more embodiments of a usage monitor module and process are described initially with reference to FIGS. 2-3. FIG. 2 depicts one embodiment of usage monitor module 200 that includes code or instructions to perform usage monitor-related processing, in accordance with one or more aspects of the present disclosure, and FIG. 3 depicts one embodiment of a usage monitor process, in accordance with one or more aspects of the present disclosure.

Referring to FIGS. 1-2, usage monitor module 200 includes, in one example, various sub-modules used to perform processing, in accordance with one or more aspects of the present disclosure. The sub-modules are, e.g., computer-readable program code (e.g., instructions) and computer-readable media (e.g., persistent storge (e.g., persistent storage 113, such as a disk) and/or a cache (e.g., cache 121), as examples). The computer-readable media can be part of a computer program product and can be executed by and/or using one or more computers, such as computer(s) 101; one or more processor sets 110 (FIG. 1); processors, such as one or more processors of processor set 110; and/or processing circuitry, such as processing circuitry of processor set 110, etc.

As noted, FIG. 2 depicts one embodiment of a usage monitor module 200 which, in one or more embodiments, includes, or facilitates, usage monitor processing in accordance with one or more aspects of the present disclosure. In the embodiment of FIG. 2, example sub-modules of usage monitor module 200 include a software installation execution sub-module 202 to execute, at least in part, a software installation (such as a software application or software product) on a processor, where the processor includes multiple cores of different performance type. As illustrated, in one or more embodiments, software installation execution sub-module 202 can include a software installation discover sub-module 204 to automatically determine that the software installation is executing on the processor within the computing environment, and an executing process identification sub-module 206 to determine that one or more processes of the software installation are executing on one or more cores of the multiple cores of different performance type.

As illustrated in FIG. 2, in one or more embodiments, usage monitor module 200 further includes an execution usage monitor sub-module 208 for executing the usage monitor tool commensurate with executing, at least in part, the software installation on the processor. In embodiments, execution usage monitor sub-module 208 includes a process monitor sub-module 210 to monitor, during execution of the software installation, one or more processes of the software installation executing on the processor, and a processor scan sub-module 212 to scan, via a processor query, the processor at a defined frequency for core-related data of one or more particular cores of the multiple cores, where the one or more particular cores execute the one or more processes of the software installation. Further, execution usage monitor sub-module 208 includes, in one or more embodiments, a store core-related data sub-module 214 to store, based on the scanning, the core-related data of the one or more particular cores executing on the one or more processors of the software installation. In one or more embodiments, the storing is locally at, for instance, a computing machine including the processor executing the software installation.

In one or more embodiments, execution usage monitor sub-module 208 further includes a usage metric generation sub-module 216 to facilitate generating a usage metric value for a defined period of time, where the generating includes combining each core-related data, such as combining each core-related data locally at the computing machine containing the processor. In embodiments, the usage metric value is indicative for the defined period of time of usage of the one or more particular cores in executing the one or more processes of the software installation. In one or more embodiments, the execution usage monitor sub-module 208 further includes a usage metric transmit sub-module 218 to transmit the usage metric value for the defined period of time to another, recording computing machine of the computing environment, where for instance, multiple usage metric values of the defined period of time can be aggregated across multiple processors of the computing environment by the other computing machine.

Note that although various sub-modules are described herein, usage monitor module processing, such as disclosed, can use, or include, additional, fewer, and/or different sub-modules. A particular sub-module can include additional code, including code of other sub-modules, or less code. Further, additional and/or fewer sub-modules can be used. Many variations are possible.

Advantageously, in one or more aspects, improved processing within a computing environment is disclosed herein by providing a usage monitor tool to execute, commensurate within a software installation on a processor, to scan the processor at a defined frequency for core-related data of one or more particular cores executing one or more processes of the software installation. A variety of performance related changes or modifications can be based on the ascertained core-related data. Additionally, the core-related data can be used in generating a usage metric value for the defined period of time, where the generating includes combining each core-related data in the usage metric value, and where the value is indicative for the period of time of usage of one or more particular cores of the multiple cores of different performance type in executing one or more processes of the software installation. By way of example only, the usage metric value can be used, in one or more embodiments, as a software usage metric for ascertaining cost of a license, such as where the license is dependent on the amount of utilization of a particular software product.

Advantageously, in one or more aspects, the core-related data obtained by scanning the processor at the defined frequency commensurate with executing the software installation can be stored locally, for instance, locally on a computing machine containing the processor, and at the defined period of time be used to generate the usage metric value indicative of usage for one or more particular cores of the multiple cores of different performance type in executing one or more processes of the software installation. Once generated, the usage metric value can be transmitted to another, recording computing machine, such as a primary or central computing machine, of the computing environment, where multiple usage metric values for the defined period of time can be aggregated across multiple processors of the computing environment by the recording computing machine. In this manner, network bandwidth is significantly reduced by generating the usage metric value, for instance, at the computing machine containing the processor executing the software installation, and then transmitting the usage metric value to the computing machine without transmitting all of the core-related data used to generate the usage metric value, thereby facilitating reducing data transmissions within the computing environment relating to the usage monitor tool or module.

In one or more embodiments, the usage monitor module is used, in accordance with one or more aspects of the present disclosure, to perform usage monitor-related processing. FIG. 3 depicts one example of a usage monitor process 300, such as disclosed herein. The process is executed, in one or more embodiments, by a computing machine, such as a computer (e.g., computer 101 (FIG. 1)), and/or one or more processor sets, such as a processor or processing circuitry (e.g., of processor set 110 of FIG. 1). In one example, code or instructions implementing the process, are part of a module, such as usage monitor module 200. In other examples, the code can be included in one or more other modules and/or one or more other sub-modules of the one or more other modules. Various options are available.

As illustrated in FIG. 3, in one example, usage monitor process 300 executing on one or more computers (e.g., computer 101 of FIG. 1), one or more processor sets (e.g., processor set 110 of FIG. 1, such as a processor of processing circuitry of the processor set) discovers, or ascertains, that a software installation is executing on a processor 302, where the processor includes multiple processor cores of different performance type. For instance, the processor includes at least two cores of different performance type, such as cores with one or more different core characteristics. In one or more embodiments, the one or more different core characteristics are selected from the group consisting of core processing frequency, core type, quantity of core cache memory available, and configuration of core cache memory available. As illustrated, in one or more embodiments, usage monitor process 300 further includes identifying one or more executing processes of the software installation 304. For instance, in one or more embodiments, the one or more executing processes (or executables, or workloads of the processes) are determined or identified as associated with the software installation, and are executing on the processor. A variety of metric tools are available for discovering executing processes on a processor as relating to a particular software installation.

In one or more embodiments, usage monitor process 300 further includes monitoring execution of the one or more processes of the software installation 306. In one or more embodiments, the monitoring is during execution of the software installation. Based on the monitoring, usage monitor process 300 further includes scanning (for instance, via a processor query), the processor at a defined frequency (e.g., once per x second(s), where $x \geq 0.5$ seconds, such as 1 second), for core-related data of one or more particular cores executing the one or more processes of the software installation 308. In one or more embodiments, the scanning determines, for instance, the one or more particular cores executing the one or more processes of the software installation within the processor, and determines for the one or more particular cores, the one or more different core characteristics of the cores, where the core characteristics can be any of a variety of types of characteristic differences. For instance, in one or more embodiments, the one or more different core characteristics can be core processing frequency, core processing type, quantity of core cache memory available, and/or configuration of core cache memory available, etc. In one or more embodiments, the different core characteristics influence core processing performance.

In one or more embodiments, usage monitor process 300 further includes storing (based on the scanning), the core-related data for the one or more processes executing in the one or more particular cores of the processor 300. In one or more embodiments, the storing is locally at, for instance, the computing machine which includes the processor. In embodiments, usage monitor process 300 also includes generating for a defined period of time a usage metric value based on the stored core-related data 312. For instance, in one or more embodiments, the usage metric value can be a longer time period (e.g., once a day) than the x number of seconds between scans of the processor (e.g., every 0.5 seconds or more) for the core-related data. In the embodiment of FIG. 3, the usage monitor process 300 transmits the generated usage metric value to another computing machine 314, such as a recording or central computing machine of the computing environment for aggregation across multiple processors of the computing environment.

As noted, a variety of usage metrics can be used to evaluate a computing environment, including performance of the computing environment, performance one or more software installations executing within the computing environment, and/or use of software installations and computing resources within the computing environment, etc. Example metrics include central processing unit (CPU) processing time, CPU type, CPU usage percentage, memory usage, response time, unused available physical memory, unused virtual memory, etc., as well as other quantifiable computing resources available to a software installation. Current metrics often focus on resources at the CPU or processor level. However, counting only the number of processors used can be insufficient in certain environments. For instance, running a software installation on the most powerful CPUs will allow the installation to execute faster, and potentially allow a licensee to pay less. Thus, different rates for specific CPU types can be applied. Historically, the processing cores within a given processor or CPU have been identical cores in terms of processing capability. However, computing machines now exist with different levels of core processing within the CPUs. For instance, there are so-called performance cores and efficiency cores in certain implementations, with the former being cores that are used to, for instance, handle the most computational-intensive processes or tasks, while the latter being designed to handle lower intensity processing while consuming less energy, thereby maximizing the performance per watt ratio.

Disclosed herein are computer-implemented methods, computer program products, and computer systems which implement a usage monitor tool that scans a processor executing one or more processes of a software installation to identify core-related data of one or more particular cores of multiple cores of the processor, where the one or more particular cores execute the one or more processes of the software installation. In embodiments, multiple cores of the processor are of different performance type, such as the above-noted performance cores and efficiency cores. The stored core-related data on the one or more particular cores executing the one or more processes of the software installation can be used to generate for a defined period of time a usage metric value for the software installation, which is then transmitted to, for instance, a central or primary computing machine for any of a variety of uses, including, for instance, as a software license metric.

In one or more embodiments, the present disclosure relates to the field of digital computer systems, and more specifically, to determination of software usage metrics. While the present disclosure is not necessarily limited to such applications, various aspects of the disclosure can be appreciated through a discussion of one or more examples using this context.

Companies often license software products from software developers, and the cost of the licenses can depend on the amount of utilization of each software product. The cost of a license can be measured periodically (e.g., once per month) using a software usage metric. A software usage metric can be based on one or more factors, for example, the number of users who can use a software product, the amount of time that a software product is used, the number of times a software product is used, and the number of computing machines that the software product is installed on, etc. For a further example, each computer, computer processor, processor core, or virtual machine that uses a given software product can be assessed as a processor value unit (PVU), indicating that one instance of the product should be accounted and paid for. Given the different software product needs of entities, automatically monitoring and compiling an accurate account of software product utilization can be difficult.

The present disclosure can enable an efficient and systematic software usage metric to be created, which can be useful for large infrastructures such as cloud infrastructures, based in part on processor cores used. The present method may improve productivity in systems involving multiple software products. Aspects of the present disclosure can, for example, automatically be executed on a periodic basis.

Figure 4:
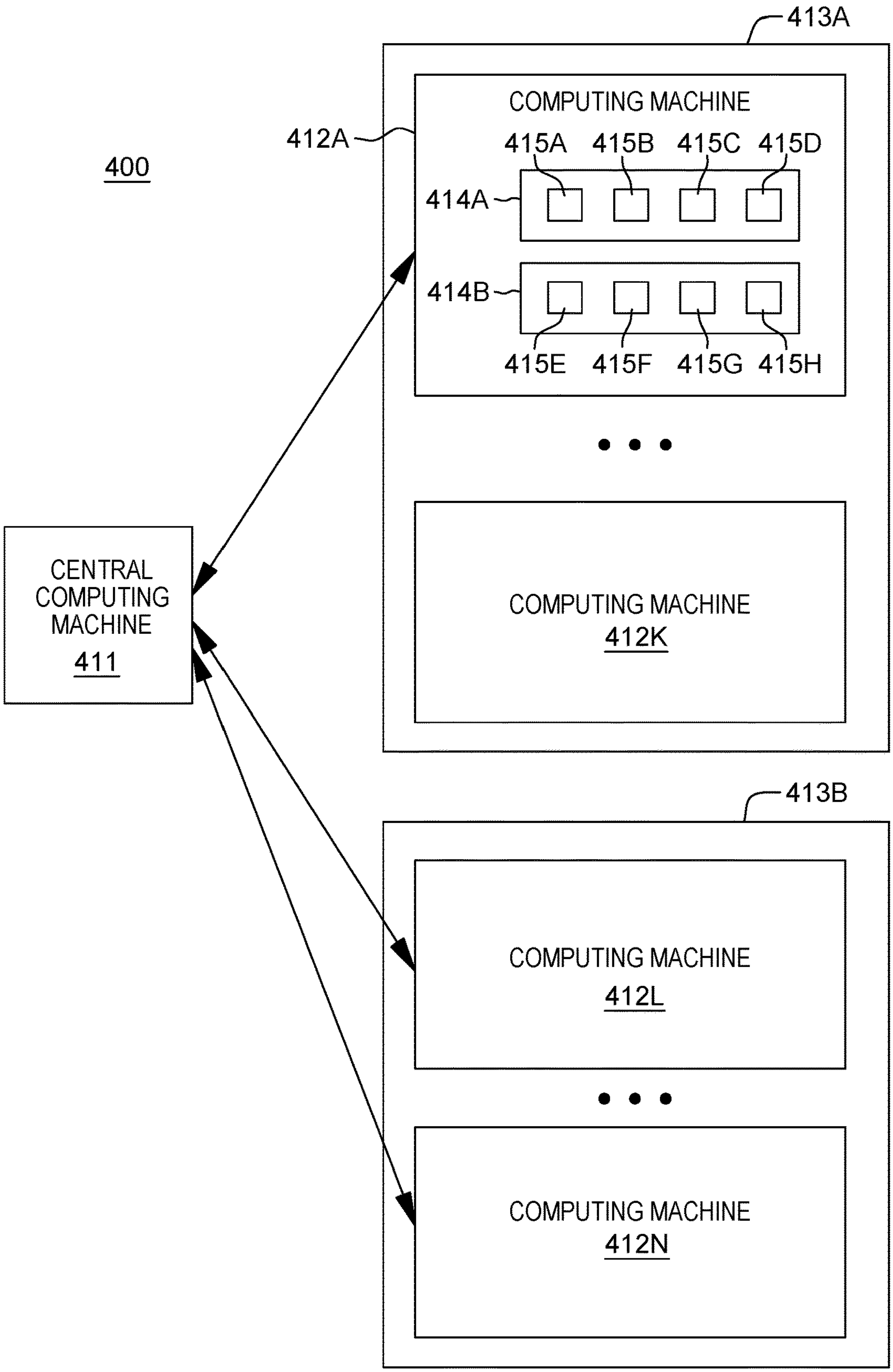
FIG. 4 depicts another example of a computing environment or computing infrastructure to include and/or use one or more aspects of the present disclosure.

FIG. 4 depicts an example computing environment 400 (or computing infrastructure) in which the present disclosure can be implemented. As depicted, computing environment 400 includes at least one control computing machine referred to as a central, recording or prime computing machine 411, and one or more computing machines 412A-N (generically referred to as computing machines 412) which can be organized into one or more groups 413A and 413B (generically referred to as groups 413) and connected to central computing machine 411 via a network. The network can, for example, include a fixed wireless network, a wireless local area network (LAN), a wireless wide area network (WAN) a personal area network (PAN), a virtual private network (VPN), intranet, or other suitable network system or combinations thereof. Computing environment 400 can, for example, be a cloud computing environment, in which the computing machines 412A-N can constitute cloud nodes that communicate with one another.

The components of computing environment 400 can reside at a single site or can be dispersed over multiple sites. For example, computing machines 412 can be separated into groups by scanning each computing machine 412 to discover properties of all computing machines 412. For example, the properties of each computing machine 412 can include, for example, physical location, logical location, processor type, or other hardware characteristics, and installed or used software products or installations. In addition, one or more groups 413 containing one or more of computing machines 412 can be provided with respective sets of software installations. Computing machines 412 of a same group 413 of computing machines 412 can share at least part of the set of software installations of that group 413. For example, group 413A, which includes computing machines 412A-K, can be used by one information technology (IT) entity, while group 413B, which includes computing machines 412L-N, can be used by another IT entity. In such an example, identifying that computing machines 412A-K belong to group 413A can be done by scanning each of computing machines 412A-K and discovering a set of software installations that is common to computing machine 412A-K but uncommon with computing machines 412L-N. Likewise, computing machines 412L-N can be identified based on another set of software installations that is common to computing machines 412L-N but uncommon with computing machines 412A-K. In another example, computing machines 412 can be grouped by types of processors they have or by other computing properties. For example, all of computing machines 412A-K can have the same type of processor in group 413A, and all of computing machines 412L-N can have the same type of processor in group 413B (albeit a different type of processor than in group 413A). Furthermore, computing machine 412A can include multiple processors 414A and 414B, each of which can include multiple cores 415A-D and 415E-H, respectively. By way of example, two or more of processing cores 415A-D and/or processing cores 415E-H can be of different performance type, such as the above-noted performance cores and efficiency cores. In one or more embodiments, each core 415 can be associated with a corresponding number of PVUs. Therefore, one or more aspects described herein can be applied with reference to computing machines 412, and in particular, can be applied for processors 414 and/or cores 415 (e.g., groups of processors or processor cores).

In some embodiments, central computing machine 411 can be configured to manage computing machines 412A-N. For example, the central computing machine 411 can store and/or utilize multiple sets of software installations and can be configured to deploy each set of software installations to the respective group 413 of computing machines 412. Therefore, central computing machine 411 can include a map which relates each set of software installations with the respective groups 413 that the software installations should be installed on. In some other embodiments, each group of computing machines 413 can be managed by a different central computing machine 411. In such embodiments, environment 400 can include two central computing machines 411 such that group 413A would be managed by a first machine 411, and group 413B would be managed by a second machine 411.

In some embodiments, each of the computing machines 412A-N can have its own hardware and/or software resources that can be used to execute applications, process data, etc., where the respective software products or installations are copied on each computing machine.

As noted, computing environment 400 of FIG. 4 depicts one example only of an environment within which one or more aspects of the computer-implemented methods, computer program products, and computer systems disclosed herein can be implemented to provide a usage monitor tool such as disclosed. In accordance with the present disclosure, software utilization is monitored at one or more computing environment levels including, for instance, at the processor core level where a processor or multiple processors include cores of different performance type. In one or more embodiments, a single processor or CPU type can include multiple different core types, such as two core types, three core types, etc. In one or more embodiments, the usage monitor tool disclosed herein executes, during execution of one or more software installations on a processor, to monitor, during executing of the software installation(s), one or more processes of the software installation executing on the processor, and scans the processor at a defined frequency for core-related data for one or more particular cores of the processor, where the one or more particular cores execute the one or more processes of the particular software installation. In one embodiment, scanning the processor can be via a processor query for the relevant core-related data of the one or more particular cores executing the one or more processes of the software installation being monitored. Based on the scanning, the core-related data of the one or more particular cores executing the one or more processes of the software installation can be stored.

In embodiments, the multiple cores of different performance type can include multiple cores with one or more different core characteristics, with the different core characteristics being, for instance, different core processing frequencies, different core types, different quantities of core cache memory available, different configurations of core cache memory available, etc.

In one or more embodiments, executing the usage monitor tool further includes generating a usage metric value for a defined period of time, where the generating includes combining each core-related data. In one or more embodiments, the usage metric value is indicative for the period of time of usage of one or more particular cores of the multiple cores of different performance type within a processor in executing one or more processes of the software installation. In one or more embodiments, scanning the processor at the defined frequency can include scanning, via the processor query, the processor every x seconds for the core-related data of the one or more particular cores of the multiple cores, with x being (for instance) in the range of 0.5 seconds to 2.5 seconds, and where the defined period of time for generating the usage metric value is greater that x seconds for the scanning the core-related data. In one specific embodiment only, x can be 1 second and the defined period of time can be, for instance, 24 hours.

In one or more embodiments, executing the usage monitor tool further includes transmitting the usage metric value for the defined period of time to a computing machine of the computing environment, where multiple usage metric values for the defined period of time are aggregated by the computing machine across multiple processors of the computing environment. For instance, in one embodiment, the computing machine is a central or primary computing machine which aggregates usage metric values across multiple processors of the computing environment.

In one or more embodiments, generating the usage metric value for the defined period of time (p) includes determining an aggregated usage metric value (v) as set forth in Equation (1).

$$v(p, f, m, r) = \sum_{i=1}^{p \cdot f} \left( \frac{m(i) \cdot t[m(i)]}{p \cdot f} \right) \quad (1)$$

where:

p—period for which metric value should be aggregated (seconds)

f—frequency of performing the scans $$\left( \frac{1}{\text{seconds}} \right)$$

m—table containing measurement results, i.e. core types recognized in given scan (core type)

r—table containing rates that should be applied for given core type $$\left( \frac{\text{metric units}}{\text{core type}} \right)$$

v—aggregated value for period p (metric units)

In one or more embodiments, executing the usage monitor tool further includes determining that the one or more processes of the software installation are executing on the processor. Further, in one or more embodiments, the scanning includes scanning the processor to identify the one or more particular cores of the processor executing the one or more processes of the software installation. In embodiments, the core-related data includes core type data for each of the one or more particular cores executing the one or more processes of the software installation.

Figure 5:
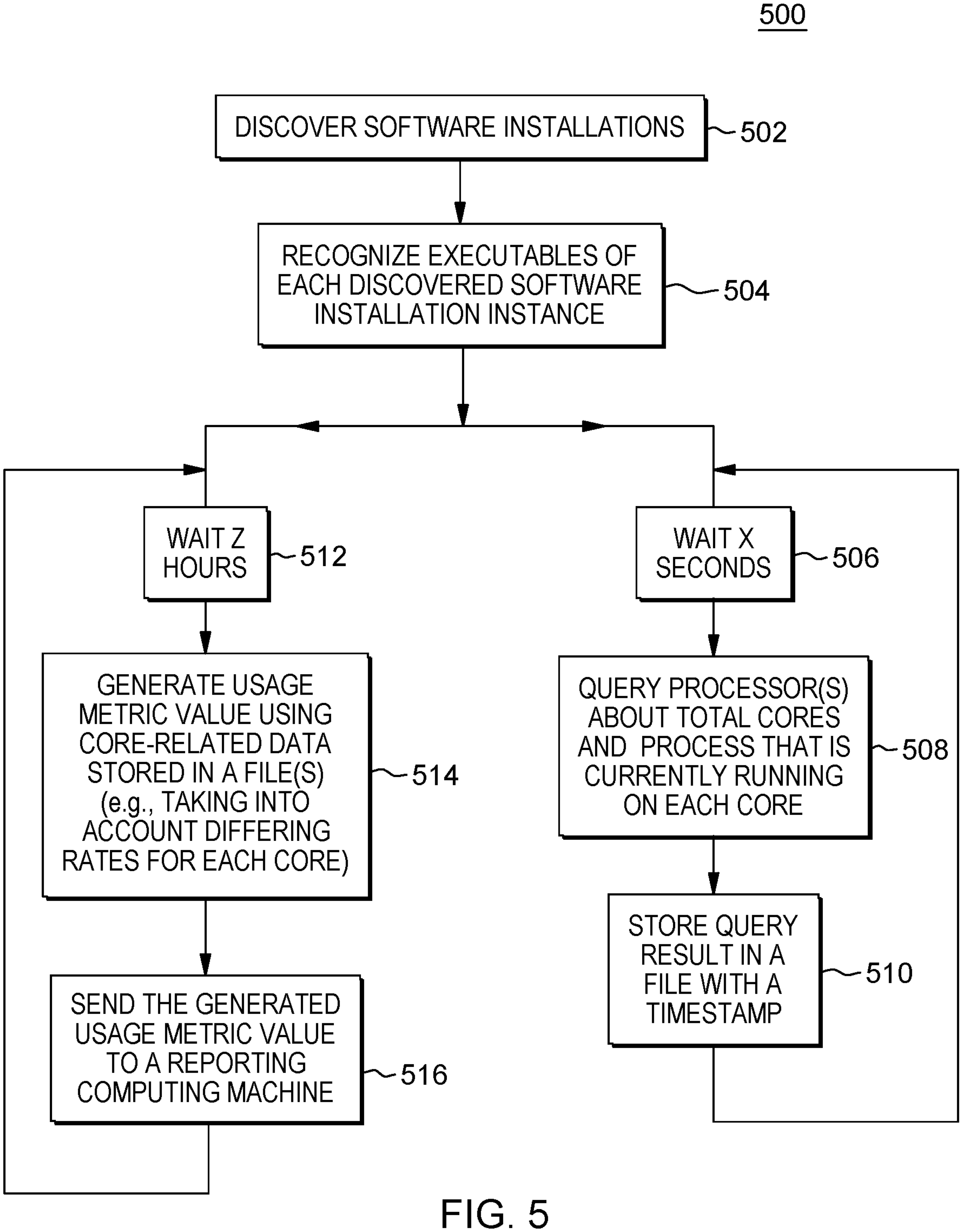
FIG. 5 depicts another embodiment of a usage monitor process, in accordance with one or more aspects of the present disclosure.

By way of further example, FIG. 5 depicts another embodiment of a usage monitor process 500 in accordance with one or more aspects of present disclosure. As illustrated, in process 500 program code discovers or ascertains that one or more software installations 502 are running, and recognizes executables (or processes) of each discovered software installation instance 504. For instance, in one or more embodiments, the usage monitor tool includes program code to discover one or more software installations (or software applications or products) in a computing environment, and recognize a respective set of executables (or processes) associated with a particular software installation. The usage monitor tool monitors a plurality of running processes associated with respective processors of a plurality of processors of the computing environment, and determines a subset of executables or processes out of the set of executables associated with one or more of the software installations, that is, that are associated with a plurality of running processes of the software installation(s). In one or more embodiments, each respective processor is scanned or probed based on a respective core-related indicator to obtain core-related data. As illustrated, in one embodiment, the process includes waiting x seconds 506, and querying the respective processor(s) about total cores and the processes currently running on each core 508. The query result (i.e., core-related data) is stored, in one embodiment, in a file with a timestamp 510. In one or more implementations, x is a few seconds or less, since the software installation processes running on a particular core can change frequently. In one or more embodiments, the core-related data can include, for instance, a predefined frequency associated with a particular core that runs a respective process workload, a respective type of core, an amount of cache memory available to a given core, etc. Usage monitor process 500 further includes for a defined period of time, such as every z hours 512, generating a usage metric value using the core-related data stored in the file 514, which takes into account the differing performance rates for each core executing one or more processes of the software installation 514. In one or more embodiments, the usage metric value can be sent to a central computing machine, or central server, which can aggregate the usage metric values of multiple computing machines of the computing environment across multiple processors of the computing machines 516.

Note that with reference to process 500 of FIG. 5, in one or more embodiments, scanning the processor(s) for the core-related data can be of higher frequency (e.g., once every second) then the aggregating of the usage metric value (e.g., once every 24 hours) to be transmitted across the network to the central computing machine, which advantageously enhances processing within the computing environment by reducing network traffic.

Advantageously, disclosed herein are computer-implemented methods, computer program products, computer systems which include a usage monitor tool that determines and tracks in context use of cores of differing performance, such as cores of different performance within a same processor or central processing unit. The usage monitor tool advantageously provides metering in central processing units containing heterogeneous cores. Advantageously, the usage monitor tool, when executing on a computing machine, identifies a software installation executing on the computing machine, recognizes the processes created by executables of the software installation, and monitors which cores within the multicore processor are selected to run the processes or workloads of the processes, and based on that to generate at the node core-related data used to ascertain the usage metric value for the defined period of time relating to computing resources used by the particular software installation.

The computing environments described herein are only examples of computing environments that can be used. One or more aspects of the present disclosure may be used with many types of environments. The computing environments provided herein are only examples. Each computing environment is capable of being configured to include one or more aspects of the present disclosure.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system can be provided. The computer system comprises a computer readable medium, in which the computer medium comprises one or more embodiments. The code in combination with the computer system is capable of performing one or more embodiments.

Although various embodiments are described above, these are only examples. For example, other memory access instructions may be used. Further, other predictors may be used, including, but not limited to, other examples of a counter table and/or a global counter. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprise” (and any form of comprise, such as “comprises” and “comprising”), “have” (and any form of have, such as “has” and “having”), “include” (and any form of include, such as “includes” and “including”), and “contain” (and any form contain, such as “contains” and “containing”) are open-ended linking verbs. As a result, a method or device that “comprises”, “has”, “includes” or “contains” one or more steps or elements possesses those one or more steps or elements, but is not limited to possessing only those one or more steps or elements. Likewise, a step of a method or an element of a device that “comprises”, “has”, “includes” or “contains” one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

executing, at least in part, a software installation on a processor, the processor having multiple cores of different performance type;

during the executing of the software installation on the processor, executing a usage monitor tool, wherein executing the usage monitor tool comprises:

monitoring, during the executing of the software installation, one or more processes of the software installation executing on the processor;

scanning, via a processor query, the processor at a defined frequency to identify one or more particular cores of the multiple cores executing the one or more processes of the software installation and to obtain core-related data for the identified one or more particular cores of the multiple cores, the one or more particular cores executing the one or more processes of the software installation;

storing, based on the scanning, the core-related data of the one or more particular cores executing the one or more processes of the software installation; and generating for a defined period of time a usage metric value based on the stored core-related data.

2. The computer-implemented method of claim 1, wherein the multiple cores of different performance type comprise multiple cores with one or more different core characteristics, the one or more different core characteristics being selected from the group consisting of core processing frequency, core type, quantity of core cache memory available, and configuration of core cache memory available.

3. The computer-implemented method of claim 1, wherein the generating includes combining each core-related data, and wherein the usage metric value is indicative for the period of time of usage of the one or more particular cores of the multiple cores of different performance type in executing the one or more processes of the software installation.

4. The computer-implemented method of claim 3, wherein the scanning comprises scanning, via the processor query, the processor every x second(s) for the core-related data of the one or more particular cores of the multiple cores, and wherein the defined period of time for generating the usage metric value is greater than the x second(s) for scanning for the core-related data of the one or more particular cores of the multiple cores executing the one or more processes of the software installation.

5. The computer-implemented method of claim 3, wherein executing the usage monitor tool further comprises transmitting the usage metric value for the defined period of time to a computing machine of the computing environment, wherein multiple usage metric values for the defined period of time are aggregated by the computing machine across multiple processors of the computing environment.

6. The computer-implemented method of claim 3, wherein generating the usage metric value for the defined period of time (p) includes determining an aggregated usage metric value (v) as follows:

$$v(p, f, m, r) = \sum_{i=1}^{p \cdot f} \left( \frac{m(i) \cdot t[m(i)]}{p \cdot f} \right)$$

where:

p—period for which metric value should be aggregated (seconds)

f—frequency of performing the scans $$\left( \frac{1}{\text{seconds}} \right)$$

m—table containing measurement results, i.e. core types recognized in given scan (core type)

r—table containing rates that should be applied for given core type $$\left( \frac{\text{metric units}}{\text{core type}} \right)$$

v—aggregated value for period p (metric units).

7. The computer-implemented method of claim 1, wherein executing the usage monitor tool further comprises determining that the one or more processes of the software installation are executing on the processor.

8. The computer-implemented method of claim 1, wherein the core-related data includes core type data for each of the identified one or more particular cores executing the one or more processes of the software installation.

9. A computer program product for facilitating processing within a computing environment, the computer program product comprising:

a set of one or more computer readable storage media; and program instructions, collectively stored in the set of one or more computer readable storage media, for causing at least one processor set to perform computer operations comprising:

executing, at least in part, a software installation on a processor, the processor having multiple cores of different performance type;

during the executing of the software installation on the processor, executing a usage monitor tool, wherein executing the usage monitor tool comprises:

monitoring, during the executing of the software installation, one or more processes of the software installation executing on the processor;

scanning, via a processor query, the processor at a defined frequency to identify one or more particular cores of the multiple cores executing the one or more processes of the software installation and to obtain core-related data for the identified one or more particular cores of the multiple cores, the one or more particular cores executing the one or more processes of the software installation;

storing, based on the scanning, the core-related data of the one or more particular cores executing the one or more processes of the software installation; and generating for a defined period of time a usage metric value based on the stored core-related data.

10. The computer program product of claim 9, wherein the multiple cores of different performance type comprise multiple cores with one or more different core characteristics, the one or more different core characteristics being selected from the group consisting of core processing frequency, core type, quantity of core cache memory available, and configuration of core cache memory available.

11. The computer program product of claim 9, wherein the generating includes combining each core-related data, and wherein the usage metric value is indicative for the period of time of usage of the one or more particular cores of the multiple cores of different performance type in executing the one or more processes of the software installation.

12. The computer program product of claim 11, wherein the scanning comprises scanning, via the processor query, the processor every x second(s) for the core-related data of the one or more particular cores of the multiple cores, and wherein the defined period of time for generating the usage metric value is greater than the x second(s) for scanning for the core-related data of the one or more particular cores of the multiple cores executing the one or more processes of the software installation.

13. The computer program product of claim 11, wherein executing the usage monitor tool further comprises transmitting the usage metric value for the defined period of time to a computing machine of the computing environment, wherein multiple usage metric values for the defined period of time are aggregated by the computing machine across multiple processors of the computing environment.

14. The computer program product of claim 9, wherein executing the usage monitor tool further comprises determining that the one or more processes of the software installation are executing on the processor.

15. A computer system for facilitating processing within a computing environment, the computer system comprising:

at least one processor set;

a set of one or more computer readable storage media; and program instructions, collectively stored in the set of one or more computer readable storage media, for causing the at least one processor set to perform computer operations comprising:

executing, at least in part, a software installation on a processor, the processor having multiple cores of different performance type;

during the executing of the software installation on the processor, executing a usage monitor tool, wherein executing the usage monitor tool comprises:

monitoring, during the executing of the software installation, one or more processes of the software installation executing on the processor;

scanning, via a processor query, the processor at a defined frequency to identify one or more particular cores of the multiple cores executing the one or more processes of the software installation and to obtain core-related data for the identified one or more particular cores of the multiple cores, the one or more particular cores executing the one or more processes of the software installation;

storing, based on the scanning, the core-related data of the one or more particular cores executing the one or more processes of the software installation; and generating for a defined period of time a usage metric value based on the stored core-related data.

16. The computer system of claim 15, wherein the multiple cores of different performance type comprise multiple cores with one or more different core characteristics, the one or more different core characteristics being selected from the group consisting of core processing frequency, core type, quantity of core cache memory available, and configuration of core cache memory available.

17. The computer system of claim 15, wherein the generating includes combining each core-related data, and wherein the usage metric value is indicative for the period of time of usage of the one or more particular cores of the multiple cores of different performance type in executing the one or more processes of the software installation.

18. The computer system of claim 17, wherein the scanning comprises scanning, via the processor query, the processor every x second(s) for the core-related data of the one or more particular cores of the multiple cores, and wherein the defined period of time for generating the usage metric value is greater than the x second(s) for scanning for the core-related data of the one or more particular cores of the multiple cores executing the one or more processes of the software installation.

* * * * *